United States Patent
Lee et al.

(10) Patent No.: US 12,333,408 B2
(45) Date of Patent: Jun. 17, 2025

(54) ELECTRONIC DEVICE FOR GENERATING DATA AND IMPROVING TASK PERFORMANCE BY USING ONLY VERY SMALL AMOUNT OF DATA WITHOUT PRIOR KNOWLEDGE OF ASSOCIATIVE DOMAIN AND OPERATING METHOD THEREOF

(71) Applicant: Korea Advanced Institute of Science and Technology, Daejeon (KR)

(72) Inventors: Sang Wan Lee, Daejeon (KR); Chang Hwa Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 886 days.

(21) Appl. No.: 17/411,853

(22) Filed: Aug. 25, 2021

(65) Prior Publication Data

US 2022/0067487 A1    Mar. 3, 2022

(30) Foreign Application Priority Data

Aug. 31, 2020   (KR) .................. 10-2020-0109802

(51) Int. Cl.
  *G06N 3/045*    (2023.01)
  *G06F 18/214*   (2023.01)
  *G06V 10/75*    (2022.01)

(52) U.S. Cl.
  CPC ......... *G06N 3/045* (2023.01); *G06F 18/2148* (2023.01); *G06V 10/7515* (2022.01)

(58) Field of Classification Search
  CPC . G06N 3/045; G06V 10/7515; G06F 18/2148
  See application file for complete search history.

(56) References Cited

U.S. PATENT DOCUMENTS

| | | | |
|---|---|---|---|
| 2019/0294961 A1* | 9/2019 | Zuev | G06N 3/08 |
| 2021/0158104 A1* | 5/2021 | Wu | G06F 18/217 |
| 2021/0166091 A1* | 6/2021 | Miller, Jr. | G06F 18/29 |
| 2021/0342701 A1* | 11/2021 | Ayush | G06F 18/2193 |
| 2021/0406779 A1* | 12/2021 | Hu | G06N 3/045 |

OTHER PUBLICATIONS

Transactions on Computing Practices, vol. 25, No. 8, 397-401pages (Aug. 2019).
Zhengli Zhai et al., Multi-Scale Dynamic Graph Convolution Network for Point Clouds Classification, IEEE Access (vol. 8), 65591-65598pages (Apr. 2, 2020).

* cited by examiner

*Primary Examiner* — Beau D Spratt
(74) *Attorney, Agent, or Firm* — CHRISTENSEN O'CONNOR JOHNSON KINDNESS PLLC

(57) ABSTRACT

Various embodiments provide an electronic device for generating data and improving task performance by using only a very small amount of data without prior knowledge of an associative domain and an operating method thereof. According to various embodiments, the electronic device may be configured to construct a plurality of data pairs from at least three data points, acquire relative information between the data points with respect to each of the data pairs, and learn a transformation function between the data points based on the relative information. According to various embodiments, the transformation function which can be learnt without a data overfitting problem even in a very small amount of data can be provided.

12 Claims, 9 Drawing Sheets

ELECTRONIC DEVICE FOR GENERATING DATA AND IMPROVING TASK PERFORMANCE BY USING ONLY VERY SMALL AMOUNT OF DATA WITHOUT PRIOR KNOWLEDGE OF ASSOCIATIVE DOMAIN AND OPERATING METHOD THEREOF

CROSS-REFERENCES TO RELATED APPLICATIONS

This application is based on and claims priority under 35 U.S.C. 119 to Korean Patent Application No. 10-2020-0109802, filed on Aug. 31, 2020 in the Korean intellectual property office, the disclosures of which are herein incorporated by reference in their entireties.

TECHNICAL FIELD

Various embodiments relate to an electronic device for generating data and improving task performance by using only a very small amount of data without prior knowledge of an associative domain and an operating method thereof.

BACKGROUND OF THE INVENTION

In general, deep learning is a technology for learning a non-linear pattern present in a large amount of data. In particular, more abundant data is necessary in a data generation problem based on deep learning. However, there is a problem in that the acquisition of data is limited in the real world.

In the existing deep learning, the above problem is solved in a way to train on the sufficient amount of data in a similar field, and transfer/use the associative knowledge to/in a new field whose data is small. Such a method greatly limits an applicable field in that an assumption that abundant data related to a similar field must be present is necessary.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various embodiments provide an electronic device for generating data and improving task performance by using only a very small amount of data without prior knowledge of an associative domain and an operating method thereof.

In various embodiments, an operating method of an electronic device may include constructing a plurality of data pairs from at least three data points, acquiring relative information between the data points with respect to each of the data pairs, and learning a transformation function between the data points based on the relative information.

In various embodiments, an electronic device includes a memory and a processor connected to the memory and configured to execute at least one instruction stored in the memory. The processor may be configured to construct a plurality of data pairs from at least three data points, acquire relative information between the data points with respect to each of the data pairs, and learn a transformation function between the data points based on the relative information.

In various embodiments, a non-transitory computer-readable storage medium may store one or more programs for executing constructing a plurality of data pairs from at least three data points, acquiring relative information between the data points with respect to each of the data pairs, and learning a transformation function between the data points based on the relative information.

According to various embodiments, the electronic device can learn a transformation function by using only a very small amount of data without prior knowledge of an associative domain. In this case, the transformation function which may be trained without a data overfitting problem even in a very small amount of data can be provided. Accordingly, the transformation function may be used to generate new data. That is, new data can be generated using only a very small amount of data. Accordingly, data having an amount necessary for deep learning can be constructed, so that task performance for deep learning can be improved. This enables deep learning to be actively used in a technical field for which the use of deep learning is limited. Furthermore, this may also affect a technical field for which deep learning is used.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Hereinafter, various embodiments of this document are described with reference to the accompanying drawings.

According to various embodiments, an electronic device may learn a transformation function by using only a very small amount of data without prior knowledge of an associative domain. In this case, the data may consist of at least three data points. Furthermore, the electronic device may learn the transformation function based on a relative relation between the data points. Accordingly, the transformation function may be used to generate new data. That is, the transformation function may be used to generate target data from source data. In this case, when being used, the transformation function may be modified and may be used without being modified. For example, when a first data point and a second data point are given, the electronic device may derive a 45° rotation function as a transformation function between the first data point and the second data point. In such a case, in order to generate target data from source data, the 45° rotation function may be used, or a transformation function modified based on the 45° rotation function, for example, a 30° rotation function may be used. Accordingly, task performance for deep learning can be improved because the transformation function generates target data for training, together with the source data.

Figure 1:
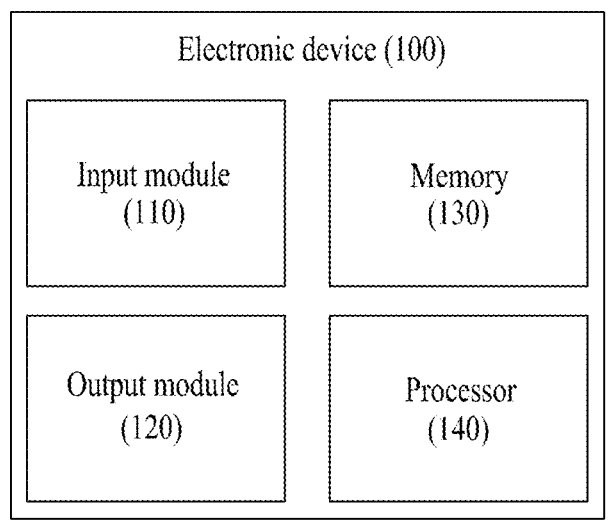
FIG. 1 is a diagram illustrating an electronic device according to various embodiments.
Figure 2A:
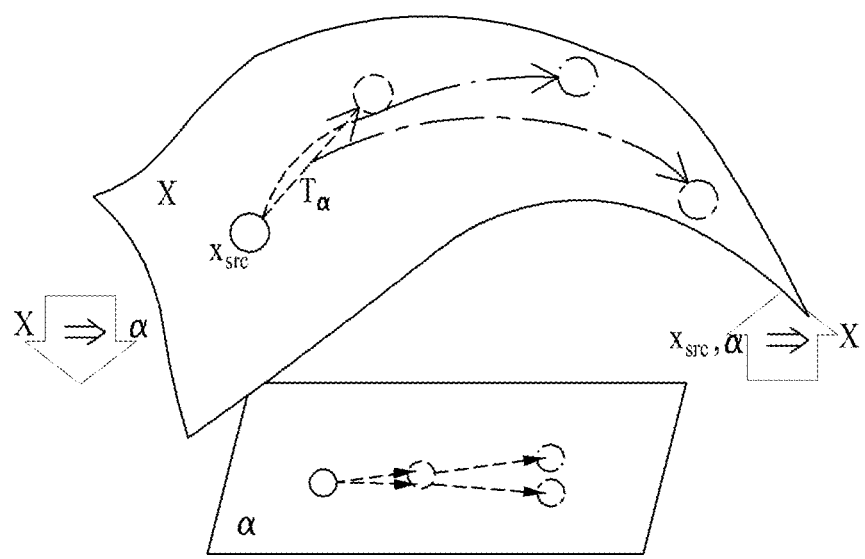
FIGS. 2A and 2B are diagrams for describing operating characteristics of a processor of FIG. 1.
Figure 2B:
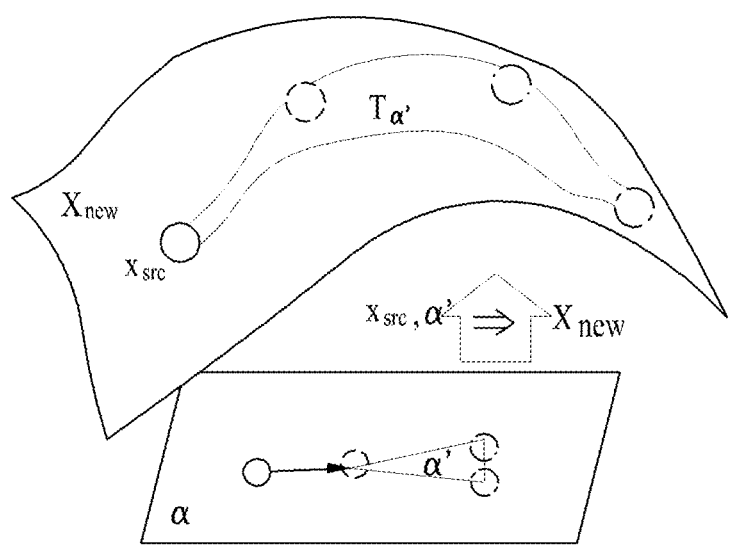
Figure 3:
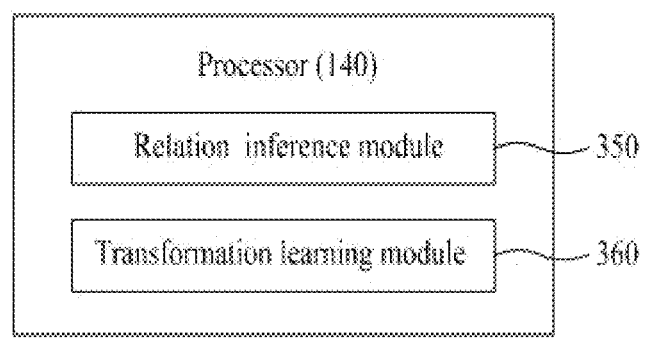
FIG. 3 is a diagram illustrating the processor of FIG. 1.
Figure 4:
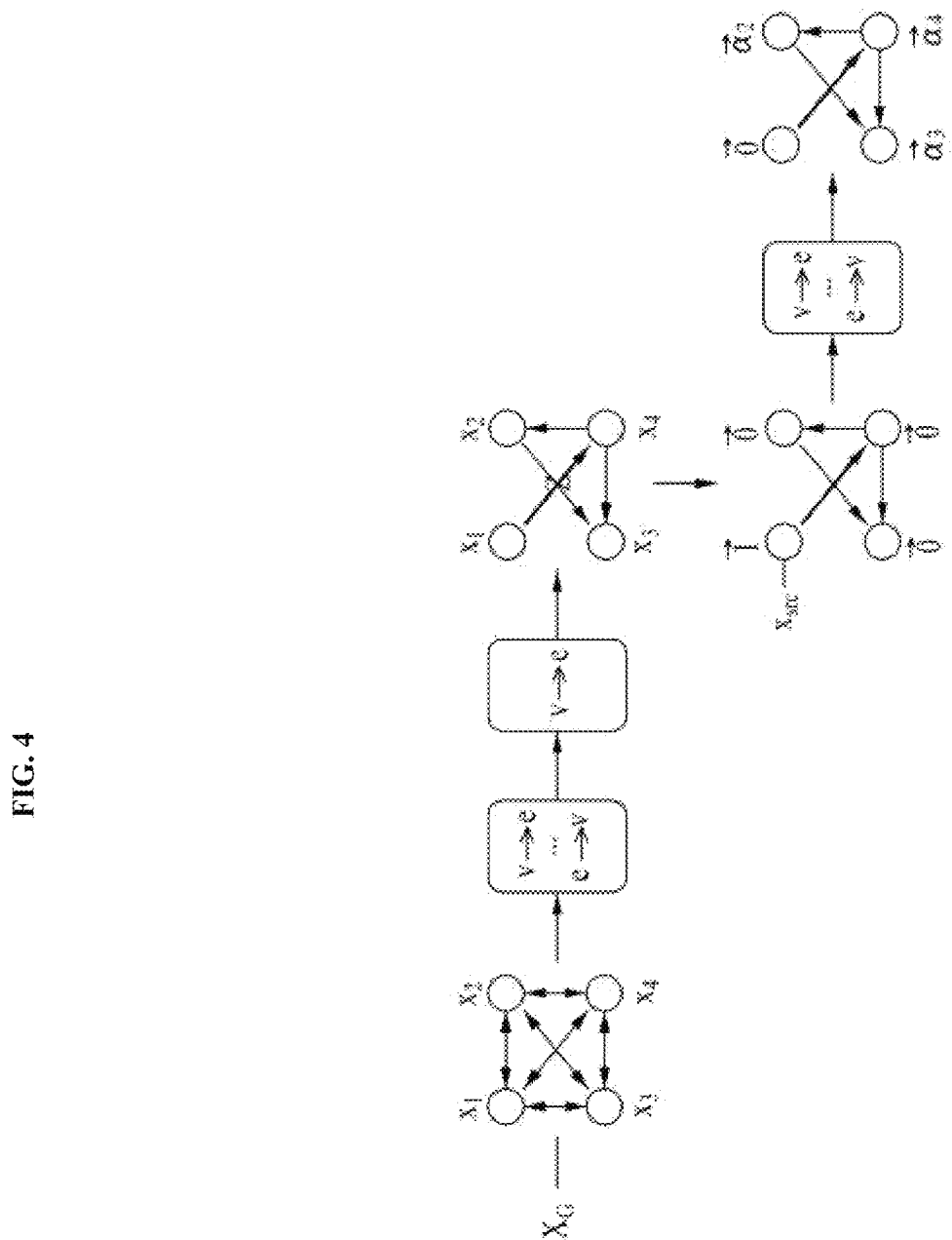
FIG. 4 is a diagram for describing an example of an operation of a relation inference module of FIG. 3.
Figure 5:
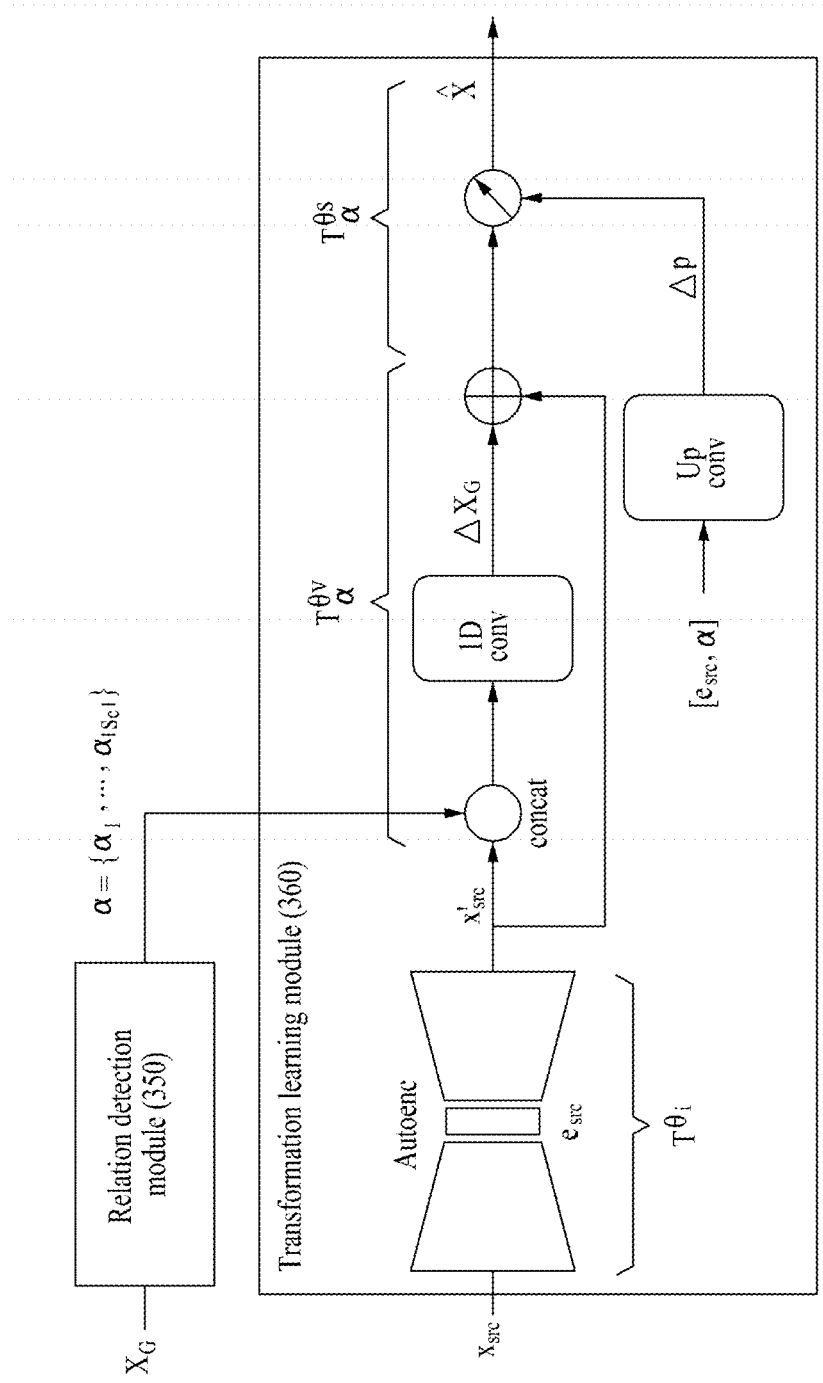
FIG. 5 is a diagram for describing an example of an operation of a transformation learning module of FIG. 3.

FIG. 1 is a diagram illustrating an electronic device 100 according to various embodiments. FIGS. 2A and 2B are diagrams for describing operating characteristics of a processor 140 of FIG. 1. FIG. 3 is a diagram illustrating the processor 140 of FIG. 1. FIG. 4 is a diagram for describing an example of an operation of a relation inference module 350 of FIG. 3. FIG. 5 is a diagram for describing an example of an operation of a transformation learning module 360 of FIG. 3.

Referring to FIG. 1, the electronic device 100 according to various embodiments may include at least one of an input module 110, an output module 120, a memory 130, or a processor 140. In an embodiment, at least one of the components of the electronic device 100 may be omitted, and at least one other component may be added to the electronic device 100. In an embodiment, at least two of the components of the electronic device 100 may be implemented as a single integrated circuit.

The input module 110 may receive a signal to be used for at least one component of the electronic device 100. The input module 110 may include at least one of an input device configured to enable a user to directly input a signal to the electronic device 100, a sensor device configured to generate a signal by sensing a surrounding change, or a reception device configured to receive a signal from an external device. For example, the input device may include at least one of a microphone, a mouse or a keyboard. In an embodiment, the input device may include at least one of touch circuitry configured to detect a touch or a sensor circuit configured to measure the intensity of a force generated by a touch.

The output module 120 may output information to the outside of the electronic device 100. The output module 120 may include at least one of a display device configured to visually output information, an audio output device capable of outputting information in the form of an audio signal, or a transmission device capable of wirelessly transmitting information. For example, the display device may include at least one of a display, a hologram device or a projector. For example, the display device may be assembled with at least one of the touch circuit or sensor circuit of the input module 110, and thus may be implemented as a touch screen. For example, the audio output module may include at least one of a speaker or a receiver.

According to an embodiment, the reception device and the transmission device may be implemented as a communication module. The communication module may perform communication with an external device in the electronic device 100. The communication module may establish a communication channel between the electronic device 100 and the external device, and may perform communication with the external device through the communication channel. In this case, the external device may include at least one of a satellite, a base station, a server or another electronic device. The communication module may include at least one of a wired communication module or a wireless communication module. The wired communication module is connected to the external device in a wired way, and may communicate with the external device in a wired way. The wireless communication module may include at least one of a short-distance communication module or a long-distance communication module. The short-distance communication module may communicate with the external device using the short-distance communication method. For example, the short-distance communication method may include at least one of Bluetooth, WI-Fi direct, or infrared data association (IrDA). The long-distance communication module may communicate with the external device using the long-distance communication method. In this case, the long-distance communication module may communicate with the external device over a network. For example, the network may include at least one of a cellular network, the Internet, or a computer network, such as a local area network (LAN) or a wide area network (WAN).

The memory 130 may store various data used by at least one component of the electronic device 100. For example, the memory 130 may include at least one of a volatile memory or a nonvolatile memory. The data may include at least one program and input data or output data related thereto. The program may be stored in the memory 130 as software including at least one instruction, and may include at least one of an operating system, middleware, or an application.

The processor 140 may control at least one component of the electronic device 100 by executing a program of the memory 130. Accordingly, the processor 140 may perform data processing or an operation. In this case, the processor 140 may execute an instruction stored in the memory 130.

According to various embodiments, as illustrated in FIG. 2A, the processor 140 may learn a transformation function $T_\alpha$ by using a very small amount of data X without prior knowledge of an associative domain. In this case, as illustrated in FIG. 2B, the transformation function $T_\alpha$ may be used to generate new data $X_{new}$. That is, the transformation function $T_\alpha$ may be used to generate target data from source data. In this case, when being used, the transformation function $T_\alpha$ may be modified ($T_\alpha \rightarrow T_{\alpha'}$) and may be used without being modified. According to an embodiment, the processor 140 may directly synthesize the target data from the source data by using the transformation function ($T_\alpha \rightarrow T_{\alpha'}$). Accordingly, task performance for deep learning can be improved because the transformation function $T_{\alpha'}$ generates target data $X_{new}$ for training, together with the source data.

According to various embodiments, as illustrated in FIG. 3, the processor 140 may include a relation inference module 350 and a transformation learning module 360.

The relation inference module 350 may make inference about the relative relation within data. In this case, the data may consist of a plurality of data points $X=\{x_{src}, x_m, \ldots, x_n\}$. In this case, the data may include at least three data points $X=\{x_1, x_2, x_3, x_4, \ldots\}$. Furthermore, the relation inference module 350 may make inference about the relative relation a between the data points. Specifically, the relation inference module 350 may construct a plurality of data pairs from the data points $X_G=\{(x_{src}, x_{src}), (x_{src}, x_m), \ldots, (x_{src}, x_n)\}$. In this case, as illustrated in FIG. 4, the relation inference module 350 may construct the data pairs by arranging the data points as a graph model structure by using a graph neural network. Accordingly, the relation inference module 350 may inference relative information α between data points with respect to each of the data pairs. In this case, the relation inference module 350 may inference the relative information α by encoding transformation parameters $\vec{\alpha}$ of the data pairs $\alpha = \{\vec{\alpha}_{(src,src)}, \vec{\alpha}_{(src,m)}, \ldots, \vec{\alpha}_{(src,n)}\} = \{\vec{\alpha}_{src},$ $\vec{\alpha}_m, \ldots, \vec{\alpha}_n$. Accordingly, the relation inference module 350 may be denoted as an encoder.

The transformation learning module 360 may learn the transformation function $T_\alpha$ for data based on a relative relation of the data. In this case, the transformation learning module 360 may learn the transformation function $T_\alpha$ between data points based on the relative information $\alpha$. In this case, the transformation learning module 360 may learn the transformation function $T_\alpha$ based on the relative information $\alpha$ by using a convolutional neural network. For example, as illustrated in FIG. 5, the transformation learning module 360 may learn each of an identical transformation function $T^{\theta_i}$, a value transformation function $T^{\theta_v}$ and a spatial transformation function $T^{\theta_s}$, and may generate the transformation function $T_\alpha$ as a combination of them. In this case, the learning of the identical transformation function $T^{\theta_i}$, the learning of the value transformation function $T_\alpha^{\theta_v}$, and the learning of the spatial transformation function $T_\alpha^{\theta_s}$ may be simultaneously performed. For example, the transformation function $T_\alpha = (T_\alpha^{\theta_s} \cdot T_\alpha^{\theta_v} \cdot T^{\theta_i})$ may be generated from the identical transformation function $T^{\theta_i}$, the value transformation function $T_\alpha^{\theta_v}$ and the spatial transformation function $T_\alpha^{\theta_s}$. For another example, when being used, the transformation function $T_\alpha$ may be modified ($T_\alpha \rightarrow T_{\alpha'}$). The modified transformation function $T_{\alpha'} = (T_{\alpha'}^{\theta_s} \cdot T_{\alpha'}^{\theta_v} \cdot T^{\theta_i})$ may be generated from the identical transformation function $T^{\theta_i}$, a modified value transformation function $T_{\alpha'}^{\theta_v}$ and a modified spatial transformation function $T_{\alpha'}^{\theta_s}$.

Figure 6:
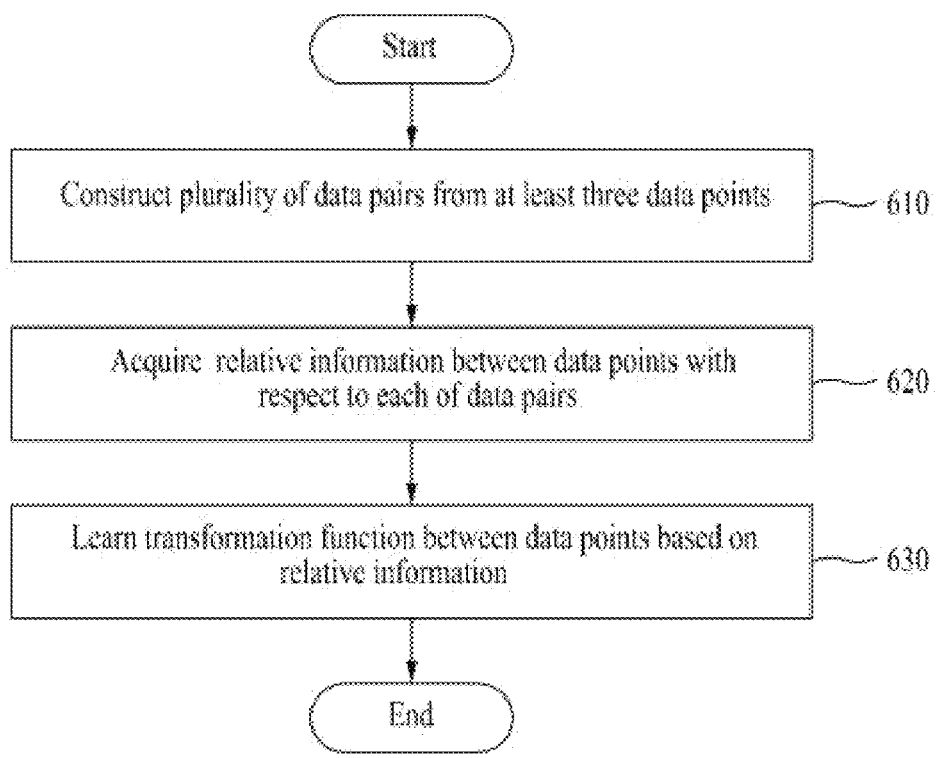
FIG. 6 is a diagram illustrating an operating method of the electronic device according to various embodiments.
Figure 7:
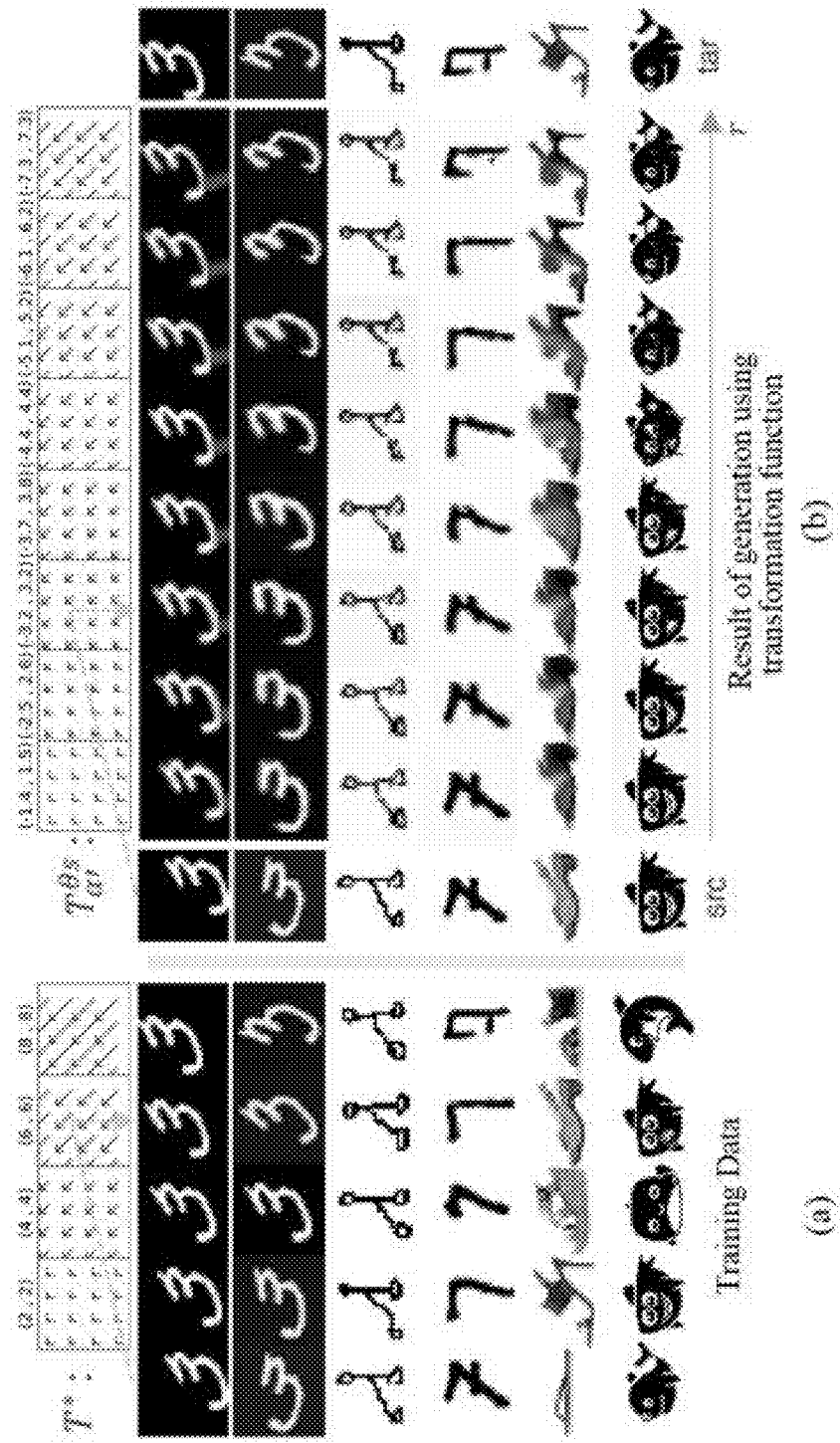
FIGS. 7 and 8 are diagrams for describing the use of a transformation function learnt in the electronic device according to various embodiments.
Figure 8:
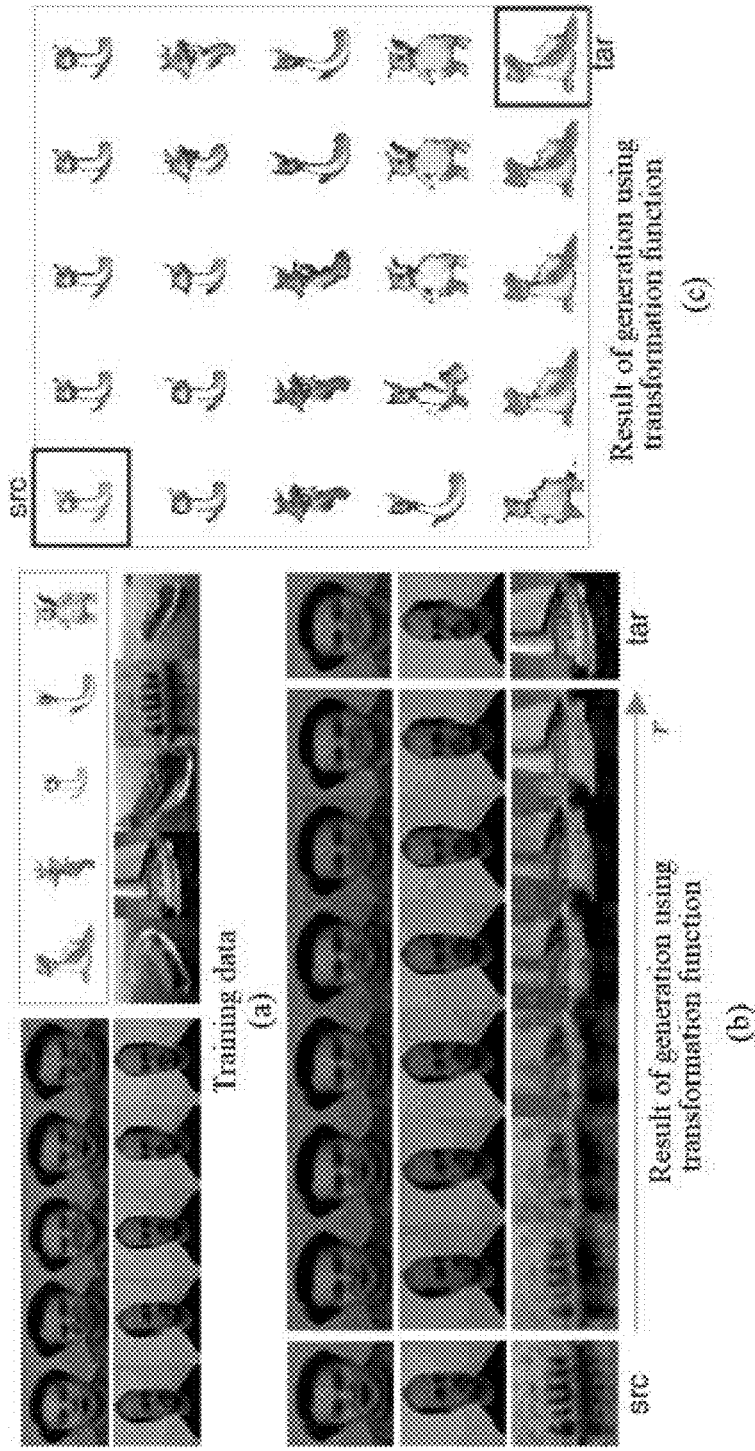

FIG. 6 is a diagram illustrating an operating method of the electronic device 100 according to various embodiments. FIGS. 7 and 8 are diagrams for describing the use of the transformation function learnt in the electronic device 100 according to various embodiments.

Referring to FIG. 6, in step 610, the electronic device 100 may construct a plurality of data pairs from at least three data points. In this case, the data may consist of a plurality of data points $X = \{x_{src}, x_m, \ldots, x_n\}$. In this case, the data may include at least three data points $X = \{x_1, x_2, x_3, x_4, \ldots\}$. As illustrated in FIG. 4, the processor 140 may construct data pairs by arranging data points as a graph model structure by using a graph neural network $X_G = \{(x_{src}, x_{src}), (x_{src}, x_m), \ldots, (x_{src}, x_n)\}$.

In step 620, the electronic device 100 may acquire relative information $\alpha$ between the data points with respect to each of the data pairs. The processor 140 may acquire the relative information $\alpha$ by encoding transformation parameters $\vec{\alpha}$ of the data pairs $\alpha = \{\vec{\alpha}_{(src,src)}, \vec{\alpha}_{(src,m)}, \ldots, \vec{\alpha}_{(src,n)}\} = \{\vec{\alpha}_{src}, \vec{\alpha}_m, \ldots, \vec{\alpha}_n\}$. In this case, as that illustrated in FIG. 4, the processor 140 may inference the transformation parameters from one ($x_{src}$) of the data points to the data points $x_{src}, x_m, \ldots, x_n$, respectively, based on the graph model structure. For example, the processor 140 may set, as an initial value, a transformation parameter $\vec{\alpha}_{src}$ of a corresponding data point $x_{src}$ from one of the data points, that is, one ($x_{src}$) of the data points. For example, the initial value may be a zero vector $\vec{0}$. Furthermore, the processor 140 may make inference about transformation parameters $\vec{\alpha}_m, \ldots, \vec{\alpha}_n$ from one ($x_{src}$) of the data points to the remaining data points $x_m, \ldots, x_n$, respectively. Accordingly, the processor 140 may acquire the relative information $\alpha$ by encoding transformation parameters $\{\vec{\alpha}_{src}, \vec{\alpha}_m, \ldots, \vec{\alpha}_n\}$ based on a graph model structure, such as that illustrated in FIG. 4.

In step 630, the electronic device 100 may learn a transformation function between the data points based on the relative information of the data pairs. The electronic device 100 may learn the transformation function $T_\alpha$ between the data points based on the relative information ($\alpha$). In this case, the processor 140 may learn the transformation function $T_\alpha$ based on the relative information $\alpha$ by using a convolutional neural network.

For example, as illustrated in FIG. 5, the processor 140 may learn each of the identical transformation function $T^{\theta_i}$, the value transformation function $T_\alpha^{\theta_v}$ and the spatial transformation function $T_\alpha^{\theta_s}$, and may generate the transformation function $T_\alpha$ as a combination of them. Specifically, the processor 140 may learn the identical transformation function $T^{\theta_i}$ by reconstructing one ($x_{src}$) of the data points using an autoencoder network. Furthermore, the processor 140 may learn the value transformation function $T_\alpha^{\theta_v}$ by applying the relative information $\alpha$ and a reconstructed data point $x'_{src}$ to a one-dimensional (1-D) convolution network and combining, with the reconstructed data point $x'_{src}$, a pixel-wise value offset $\Delta x$ outputted from the 1-D convolution network. Thereafter, the processor 140 may learn the spatial transformation function $T_\alpha^{\theta_s}$ by applying, to an up-convolution network, the relative information $\alpha$ and a feature value $e_{src}$ extracted from the bottleneck layer of the autoencoder network and transforming a result value of the value transformation function $T_\alpha^{\theta_v}$ based on a pixel-wise transition offset $\Delta p$ outputted from the up-convolution network. In this case, the learning of the identical transformation function $T^{\theta_i}$, the learning of the value transformation function $T_\alpha^{\theta_v}$, and the learning of the spatial transformation function $T_\alpha^{\theta_s}$ may be simultaneously performed. For example, the transformation function $T_\alpha = (T_\alpha^{\theta_s} \cdot T_\alpha^{\theta_v} \cdot T^{\theta_i})$ may be generated from the identical transformation function $T^{\theta_i}$, the value transformation function $T_\alpha^{\theta_v}$ and the spatial transformation function $T^{\theta_s}$. For another example, when being used, the transformation function $T_\alpha$ may be modified ($T_\alpha \rightarrow T_{\alpha'}$). The modified transformation function $T_{\alpha'} = (T_{\alpha'}^{\theta_s} \cdot T_{\alpha'}^{\theta_v} \cdot T^{\theta_i})$ may be generated from the identical transformation function $T^{\theta_i}$, a modified value transformation function $T_{\alpha'}^{\theta_v}$ and a modified spatial transformation function $T_{\alpha'}^{\theta_s}$.

According to various embodiments, the transformation function $T_\alpha$ may be used to generate new data $X_{New}$. That is, the transformation function $T_\alpha$ may be used to generate target data from source data. In this case, when being used, the transformation function $T_\alpha$ may be modified ($T_\alpha \rightarrow T_{\alpha'}$) and may be used without being modified.

For example, the transformation function $T_\alpha$ may be trained based on training data, such as that illustrated in FIG. 7(a), that is, five black images. In this case, the transformation function $T_\alpha$ may be generated from the spatial transformation function $T_\alpha^{\theta_s}$. As illustrated in FIG. 7(b), such a transformation function $T_\alpha$ may be used to generate target data from source data. In this case, a modified transformation function $T_{\alpha'}$ may be used. The modified transformation function $T_{\alpha'}$ may be generated from a modified spatial transformation function $T_{\alpha'}^{\theta_s}$. In other words, the modified transformation function $T_{\alpha'}$ may be used to generate the target data from the source data.

For another example, the transformation function $T_\alpha$ may be trained based on training data, such as those illustrated in FIG. 8(a), that is, five color images. As illustrated in FIG. 8(b) or 8(c), such a transformation function $T_\alpha$ may be used to generate target data from source data. In this case, a modified transformation function $T_{\alpha'}$ may be used. In other words, the modified transformation function $T_{\alpha'}$ may be used to generate the target data from the source data.

According to various embodiments, the electronic device 100 may learn the transformation function $T_\alpha$ by using only a very small amount of data without prior knowledge of an associative domain. In this case, the transformation function $T_\alpha$ which may be learnt without a data overfitting problem even in a very small amount of data can be provided. Accordingly, the transformation function $T_\alpha$ may be used to generate new data. That is, it is possible to generate new data by using only a very small amount of data. Accordingly, data having an amount necessary for deep learning can be constructed, so that task performance for deep learning can be improved. This enables deep learning to be actively used in a technical field for which the use of deep learning is limited. Furthermore, this may affect a technical field for which deep learning is already used.

Various embodiments may be used in various technical fields. For example, corresponding technical fields may include a medical artificial intelligence (AI) field, virtualization/simulation fields, a design field, etc. For example, in general, a data shortage problem greatly occurs in the medical AI field. Accordingly, medical image data may be widely expanded depending on various embodiments, and thus may be widely used by medical expert. For another example, there is a difficulty in virtualizing and simulating behavior data of a user or a system because the behavior data is very expensive. According to various embodiments, virtualization/simulation are made possible with only small experiences. Furthermore, for example, according to various embodiments, a learnt transformation function may generate data having an unexpected new pattern or characteristic. Such data may be used to provide a new idea to various design fields, such as a character design, a furniture design, and an image design.

An operating method of the electronic device 100 according to various embodiments may include a step 610 of constructing a plurality of data pairs from at least three data points, a step 620 of acquiring relative information α between the data points with respect to each of the data pairs, and a step 630 of learning a transformation function $T_\alpha$ between the data points based on the relative information α.

According to various embodiments, the transformation function $T_\alpha$ may be used to generate target data from source data.

According to various embodiments, the step 610 of constructing the data pairs may include a step of constructing the data pairs by arranging the data points as a graph model structure by using a graph neural network.

According to various embodiments, the step 620 of acquiring the relative information α may include a step of making inference about the transformation parameters $\vec{\alpha}$ from one of the data points to the data points, respectively, based on the graph model structure, and a step of acquiring the relative information α by encoding the transformation parameters $\vec{\alpha}$ based on the graph model structure.

According to various embodiments, the step of making inference about the transformation parameters $\vec{\alpha}$ may include a step of setting the transformation parameter $\vec{\alpha}$ of one of the data points as an initial value, and a step of making inference about the transformation parameters $\vec{\alpha}$ from one of the data points to the remaining data points, respectively.

According to various embodiments, the step of learning the transformation function $T_\alpha$ may include a step of learning the transformation function $T_\alpha$ based on the relative information α by using a convolutional neural network.

According to various embodiments, the step 630 of learning the transformation function $T_\alpha$ may include a step of learning an identical transformation function $T^{\theta_i}$ by reconstructing one of the data points using an autoencoder network, a step of learning a value transformation function $T_\alpha^{\theta_v}$ by applying the relative information and the reconstructed data point to a 1-D convolution network and combining, with the reconstructed data point, a pixel-wise value offset Δx outputted from the 1-D convolution network, and a step of learning a spatial transformation function $T_\alpha^{\theta_s}$ by apply, to an up-convolution network, the relative information α and a feature value $e_{src}$ extracted from the bottleneck layer of the autoencoder network and transforming a result value of the value transformation function $T_\alpha^{\theta_v}$ based on a pixel-wise transition offset Δp outputted from the up-convolution network.

According to an embodiment, the step of learning the identical transformation function $T^{\theta_i}$, the step of learning the value transformation function $T_\alpha^{\theta_v}$, and the step of learning the spatial transformation function $T_\alpha^{\theta_s}$ may be simultaneously performed.

According to various embodiments, the transformation function $T_\alpha$ may consist of a combination of the identical transformation function $T^{\theta_i}$, the value transformation function $T_\alpha^{\theta_v}$ and the spatial transformation function $T_\alpha^{\theta_s}$.

The electronic device 100 according to various embodiments may include the memory 130, and the processor 140 connected to the memory 130 and configured to execute at least one instruction stored in the memory 130.

According to various embodiments, the processor 140 may be configured to construct a plurality of data pairs from at least three data points, to acquire relative information α between the data points with respect to each of the data pairs, and to learn a transformation function $T_\alpha$ between the data points based on the relative information α.

According to various embodiments, the transformation function $T_\alpha$ may be used to generate target data from source data.

According to various embodiments, the processor may be configured to construct the data pairs by arranging the data points as a graph model structure by using a graph neural network.

According to various embodiments, the processor 140 may be configured to make inference about transformation parameters $\vec{\alpha}$ from one of the data points to the data points, respectively, based on the graph model structure and to acquire the relative information α by encoding the transformation parameters $\vec{\alpha}$ based on the graph model structure.

According to various embodiments, the processor 140 may be configured to set the transformation parameter $\vec{\alpha}$ of one of the data points as an initial value and to make inference about the transformation parameters $\vec{\alpha}$ from one of the data points to the remaining data points, respectively.

According to various embodiments, the processor 140 may be configured to learn the transformation function $T_\alpha$ based on the relative information α by using a convolutional neural network.

According to various embodiments, the processor 140 may be configured to learn an identical transformation function $T^{\theta_i}$ by reconstructing one of the data points using an autoencoder network, to learn a value transformation function $T_\alpha^{\theta_v}$ by applying the relative information $\alpha$ and the reconstructed data point to a 1-D convolution network and combining, with the reconstructed data point, a pixel-wise value offset $\Delta x$ outputted from the 1-D convolution network, and to learn a spatial transformation function $T_\alpha^{\theta_s}$ by applying, to an up-convolution network, the relative information $\alpha$ and a feature value $e_{src}$ extracted from the bottleneck layer of the autoencoder network and transforming a result value of the value transformation function $T_\alpha^{\theta_v}$ based on a pixel-wise transition offset $\Delta p$ outputted from the up-convolution network.

According to various embodiments, the transformation function $T_\alpha$ may consist of a combination of the identical transformation function $T^{\theta_i}$, the value transformation function $T_\alpha^{\theta_v}$ and the spatial transformation function $T_\alpha^{\theta_s}$.

The aforementioned device may be implemented by a hardware component, a software component or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to various embodiments may be implemented in the form of a program instruction executable by various computer means and stored in a computer-readable medium. In this case, the medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server, etc.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar components. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" or "the second", may modify corresponding components regardless of its sequence or importance, and are used to only distinguish one component from the other component and do not limit corresponding components. When it is described that one (e.g., a first) component is "(functionally or communicatively) connected to" or "coupled with" the other (e.g., a second) component, one component may be directly connected to the other component or may be connected to the other component through another component (e.g., a third component).

The term "module" used in this document includes a unit configured as hardware, software or firmware, and may be interchangeably used with a term, such as logic, a logical block, a part or a circuit. The module may be an integrated part, a minimum unit to perform one or more functions, or a part thereof. For example, the module may be configured as an application-specific integrated circuit (ASIC).

According to various embodiments, each (e.g., module or program) of the described components may include a single entity or a plurality of entities. According to various embodiments, at least one component or step of the aforementioned components may be omitted or at least one component or step may be added. Alternatively or additionally, a plurality of components (e.g., modules or programs) may be integrated into a single component. In such a case, the integrated component may perform a function, performed by a corresponding one of the plurality of components before at least one function of each of the plurality of components is integrated, identically or similarly. According to various embodiments, steps performed by a module, a program or another component may be executed sequentially, in parallel, repeatedly or heuristically, or at least one of the steps may be executed in different order or may be omitted, or at least one step may be added.

The embodiments of the invention in which an exclusive property or privilege is claimed are defined as follows:

1. An operating method of an electronic device, comprising:
   constructing a plurality of data pairs from at least three data points;
   acquiring relative information between the data points with respect to each of the data pairs; and
   learning a transformation function between the data points based on the relative information,
   wherein the transformation function is used to generate target synthetic image data for training a deep learning system from source image data, and wherein the learning of the transformation function comprises:

learning the transformation function based on the relative information by using a convolutional neural network;

learning an identical transformation function by reconstructing one of the data points by using an autoencoder network;

learning a value transformation function by applying the relative information and the reconstructed data point to a one-dimensional (1-D) convolution network and combining, with the reconstructed data point, a pixel-wise value offset outputted from the 1-D convolution network; and learning a spatial transformation function by applying, to an up-convolution network, the relative information and a feature value extracted from a bottleneck layer of the autoencoder network and transforming a result value of the value transformation function based on a pixel-wise transition offset outputted from the up-convolution network.

2. The operating method of claim 1, wherein the constructing of the plurality of data pairs comprises constructing the plurality of data pairs by arranging the data points as a graph model structure by using a graph neural network.

3. The operating method of claim 2, wherein the acquiring of the relative information comprises:

making inference about transformation parameters from one of the data points to the data points, respectively, based on the graph model structure; and acquiring the relative information by encoding the transformation parameters based on the graph model structure.

4. The operating method of claim 3, wherein the making inference about the transformation parameters comprises:

setting the transformation parameter of one of the data points as an initial value; and making inference about the transformation parameters from one of the data points to remaining data points, respectively.

5. The operating method of claim 1, wherein the transformation function has a combination of the identical transformation function, the value transformation function and the spatial transformation function.

6. An electronic device comprising:

a memory; and a processor connected to the memory and configured to execute at least one instruction stored in the memory, wherein the processor is configured to:

construct a plurality of data pairs from at least three data points, acquire relative information between the data points with respect to each of the data pairs, and learn a transformation function between the data points based on the relative information, wherein the transformation function is used to generate target synthetic image data for training a deep learning system from source image data, wherein the processor is further configured to:

learn the transformation function based on the relative information by using a convolutional neural network;

learn an identical transformation function by reconstructing one of the data points by using an autoencoder network;

learn a value transformation function by applying the relative information and the reconstructed data point to a one-dimensional (1-D) convolution network and combining, with the reconstructed data point, a pixel-wise value offset outputted from the 1-D convolution network, and learn a spatial transformation function by applying, to an up-convolution network, the relative information and a feature value extracted from a bottleneck layer of the autoencoder network and transforming a result value of the value transformation function based on a pixel-wise transition offset outputted from the up-convolution network.

7. The electronic device of claim 6, wherein the processor is configured to construct the plurality of data pairs by arranging the data points as a graph model structure by using a graph neural network.

8. The electronic device of claim 7, wherein the processor is configured to:

make inference about transformation parameters from one of the data points to the data points, respectively, based on the graph model structure; and acquire the relative information by encoding the transformation parameters based on the graph model structure.

9. The electronic device of claim 8, wherein the processor is configured to:

set the transformation parameter of one of the data points as an initial value, and make inference about the transformation parameters from one of the data points to remaining data points, respectively.

10. The electronic device of claim 6, wherein the transformation function has a combination of the identical transformation function, the value transformation function and the spatial transformation function.

11. A non-transitory computer-readable storage medium for storing one or more programs for executing:

constructing a plurality of data pairs from at least three data points;

acquiring relative information between the data points with respect to each of the data pairs; and learning a transformation function between the data points based on the relative information, wherein the transformation function is used to generate target synthetic image data for training a deep learning system from source image data, and wherein the learning of the transformation function comprises:

learning the transformation function based on the relative information by using a convolutional neural network;

learning an identical transformation function by reconstructing one of the data points by using an autoencoder network;

learning a value transformation function by applying the relative information and the reconstructed data point to a one-dimensional (1-D) convolution network and combining, with the reconstructed data point, a pixel-wise value offset outputted from the 1-D convolution network; and learning a spatial transformation function by applying, to an up-convolution network, the relative information and a feature value extracted from a bottleneck layer of the autoencoder network and transforming a result value of the value transformation function based on a pixel-wise transition offset outputted from the up-convolution network.

12. The computer-readable storage medium of claim 11, wherein the constructing of the plurality of data pairs comprises constructing the plurality of data pairs by arranging the data points as a graph model structure by using a graph neural network.

\* \* \* \* \*